United States Patent
Song et al.

(10) Patent No.: US 8,100,997 B2
(45) Date of Patent: Jan. 24, 2012

(54) DIAMOND TOOLS WITH MULTILAYERS OF ABRASIVE GRAIN AND METHOD FOR MANUFACTURING THE SAME

(75) Inventors: Min-Seok Song, Incheon (KR); Mun-Seok Park, Incheon (KR); Sug-Goo Kim, Incheon (KR); Sun-Jai Lee, Incheon (KR); Kang-Jun Kim, Incheon (KR); Kee-Jeong Cheong, Seoul (KR); Won-Ho Jee, Seongnam (KR); Shin-Kyung Kim, Seoul (KR)

(73) Assignee: Shinhan Diamond Industrial Co., Ltd., Incheon (KR)

( * ) Notice: Subject to any disclaimer, the term of this patent is extended or adjusted under 35 U.S.C. 154(b) by 974 days.

(21) Appl. No.: 10/597,841

(22) PCT Filed: Feb. 4, 2005

(86) PCT No.: PCT/KR2005/000334
§ 371 (c)(1), (2), (4) Date: Aug. 9, 2006

(87) PCT Pub. No.: WO2005/075142
PCT Pub. Date: Aug. 18, 2005

(65) Prior Publication Data
US 2007/0151554 A1    Jul. 5, 2007

(30) Foreign Application Priority Data
Feb. 9, 2004 (KR) .................. 10-2004-0008418

(51) Int. Cl.
  B24B 1/00 (2006.01)
  B24D 11/00 (2006.01)
  B24D 3/00 (2006.01)
  B24D 18/00 (2006.01)
(52) U.S. Cl. .......................... 51/295; 51/293
(58) Field of Classification Search .......... 451/51, 451/540; 129/15; 51/295–309
See application file for complete search history.

(56) References Cited

U.S. PATENT DOCUMENTS
4,091,792 A * 5/1978 Farrell ............... 125/11.22
4,624,237 A * 11/1986 Inoue ................. 125/15
(Continued)

FOREIGN PATENT DOCUMENTS
JP     6-184750     7/1994

OTHER PUBLICATIONS

English language abstract of Japanese Publication No. 6-184750.

*Primary Examiner* — Anthony Green
*Assistant Examiner* — Pegah Parvini
(74) *Attorney, Agent, or Firm* — Portland IP Law LLC

(57) ABSTRACT

The present invention relates to a diamond tool and a method of manufacturing the same, wherein multiple abrasive layers are formed through a brazing or electroplating method, thereby improving the performance and service life of the tool. According to the method of the present invention, a plurality of concave portions are formed in a surface of the shank. A bonding paste is coated into the concave portions and abrasives are dispersed in the bonding paste to thereby form a lower abrasive layer. Again, a bonding material is coated on the lower abrasive layer and abrasives are dispersed in the bonding material to thereby form an upper abrasive layer. Then, a heat treatment is executed to fusion-bond the bonding material and abrasives onto the surface of the shank. Therefore, the diamond tools manufactured through a multiple brazing or electroplating method according to the invention can significantly extend the service life thereof, which has been a detrimental weakness of the conventional diamond tools having a single abrasive layer, in spite of various advantages of the brazing and electroplating methods. Furthermore, multiple abrasive layers can be formed inside the concave portions having a desired spacing, width and depth, thereby significantly improving the service life and the cutting performance of diamond tools.

19 Claims, 12 Drawing Sheets

U.S. PATENT DOCUMENTS

| | | | |
|---|---|---|---|
| 5,007,207 A | * | 4/1991 | Phaal ............................ 451/548 |
| 5,611,326 A | * | 3/1997 | Caspani et al. ................. 125/39 |
| 5,989,405 A | * | 11/1999 | Murata et al. ................. 205/110 |
| 5,997,597 A | | 12/1999 | Hagan |
| 6,039,641 A | * | 3/2000 | Sung ............................ 451/540 |
| 6,042,463 A | | 3/2000 | Johnson et al. |

\* cited by examiner (a)        (b)

(a) (b)

DIAMOND TOOLS WITH MULTILAYERS OF ABRASIVE GRAIN AND METHOD FOR MANUFACTURING THE SAME

TECHNICAL FIELD

The present invention relates to a diamond tools with multilayers of abrasive grain and method for manufacturing the same. More specifically, the invention relates to a diamond tool and a method of manufacturing the same, wherein a concave portion is formed in a shank and multiple abrasive layers are formed using a brazing method and an electroplating method so that the service life thereof can be significantly increased, as compared with a conventional one having a single abrasive layer.

BACKGROUND ART

A diamond tool according to the present invention is applied to building stone tools such as a saw, a core drill, a cutter, a saw blade, a wire saw, a polishing cup, a profiler and an end mill, and also to precision tools such as a straight wheel, an ID wheel, a rotary dresser and an edge grinding wheel, or the like.

In general, the diamond tool is comprised of a shank and a diamond grinding stone portion ("diamond-impregnated section") attached to the shank and for cutting and grinding a workpiece. Here, the diamond-impregnated section is constructed of plural diamond particles and a metallic bonding material. Diamond generally refers to a synthetic and natural diamond, cubic boron nitride (cBN), and additionally a super abrasive such as silicone carbide and alumina, and a mixture of at least two of the aforementioned materials. Further, the shank as used herein is commonly formed of a metallic material such as stainless steel and carbon steel.

As a method of bonding the abrasive or diamond-impregnated section to a shank, it is well known a sintered-tip welding method (hereinafter, referred to as a "sintering method"), an electroplating method, a brazing method, or the like. In the sintering method, generally, a metallic bonding material and abrasives are mixed, press-compacted, and sintered to form a cutting tip, and then the sintered cutting tip is bonded to a shank through a brazing or laser welding. In the electroplating method, abrasives are attached to a shank through a wet electroplating process using a bonding material such as nickel. In the brazing method, a liquid paste of a metallic bonding material and a binder is coated on the shank, abrasives are dispersed therein, and the dispersed abrasives are bonded to the shank at elevated temperature. FIG. 1 is a sectional view of abrasives 130 bonded to a shank 110 via a bonding material 120 respectively through a sintering method (FIG. 1 (*a*)), an electroplating method (FIG. 1 (*b*)), and a brazing method (FIG. 1 (*c*)).

FIG. 2 is a front view of a saw blade where abrasives 130 are bonded to a shank 110 through a sintering method. FIG. 3 is a sectional view taken along the line II-II in FIG. 2. As described above, according to the sintering method, the metallic bonding material 120 and abrasives 130 are mixed, press-compacted, and sintered, and thus the plural abrasives 130 are non-uniformly dispersed in the metallic bonding material 120, as shown in FIG. 3. This cutting tip is bonded to the shank 110 through a weldment 115 formed by a laser welding, a resistance welding, or a silver brazing.

FIG. 4 is a front view of a saw blade where abrasives 130 are bonded to a shank 110 through a brazing method or an electroplating method. FIG. 5 is a sectional view taken along the line III-III in FIG. 4. As described above, in the brazing or electroplating method, the abrasives are directly attached to the shank 110, and thus the abrasives 130 is bonded to the surface of the shank 110 in a mono-layer.

Above about 80% of diamond tools are manufactured by the sintering method. In the diamond tools formed by the sintering method, abrasives are distributed in a multi-layer and non-uniform fashion, and the sintering method cannot he readily applied to a very complicated shank. In contrast, the electroplating and brazing method can form a single non-uniform abrasive layer or a uniform abrasive layer, and thus suitable to manufacture a diamond tool having a complicated structure. In addition, the sintering and electroplating methods do not associate a chemical reaction between diamond particles and the metallic bonding material to thereby involve a mechanical bonding having a relatively weak retention force. In the brazing method, a strong chemical bonding is occurred in the interface between the abrasives and the metallic bonding material, and thus the abrasives are rarely released during the use of tools. In addition, it does not necessitate a time and cost consuming dressing process, and can be used in a bi-directional cutting and grinding process. Accordingly, diamond tools manufactured through a brazing method have a good cutting performance, as compared with ones manufactured by a sintering or electroplating method, and in particular, provide appropriate characteristics to a dry process or DIY (Do-It-Yourself) products. Furthermore, the brazing method can maximize exposure of the abrasives, control the abrasive spacing precisely, and form a chip pocket to thereby enable a smooth mobility of slurry and grinding agent. Moreover, in a case where Ni—Cr alloy is used, the presence of Cr leads to a good corrosion resistance.

As described above, the brazing method has various merits. FIG. 6 explains a process for bonding abrasives to a shank according to a brazing method. As shown in FIG. 6, a bonding material 120 containing a brazing powder (metal powder) of paste form is coated on a shank 110 (FIG. 6 (*a*)), and then, plural abrasives 130 are dispersed in the coated paste (FIG. 6 (*b*)). Here, the paste bonding material 120, which is used to bond the abrasives 130 to the shank 110, commonly contains metal powder and a binder providing fluidity to the metal power. In addition, a drying process may be provided between the bonding material coating and the abrasive dispersion. The coated bonding material 120 and the abrasives dispersed therein are dried at a certain temperature (FIG. 6 (*c*)). Thereafter, the resultant product is held in a vacuum furnace or a reduction/inert gas atmosphere furnace at a certain elevated temperature, where the metal power in the bonding material can flow in a liquid phase and react chemically, such that the brazing metallic bonding material is melted and solidified in the shank 110 and the abrasives 110 (FIG. 6 (*d*)). At this time, the holding temperature depends on the type of the commercialized pastes, for example, about 600~1300° C. The heat source for the vacuum furnace mostly employs a high-frequency heating, a direct heating, or an indirect heating. In case of using the gas atmospheric furnace, a continuous type gas furnace using a conveyor can be utilized to thereby enhance the production efficiency, as compared with a vacuum furnace, which is mostly a batch type furnace.

As described above, in the sintering method, metal powder as a bonding material and abrasives are mixed, press-compacted to a certain desired shape, and sintered, and therefore the abrasives are formed in multi layers. Thus, although the abrasives are released during use of the tool, a lower abrasive layer is continually exposed and participates in the cutting and grinding work, thereby extending the service life of the tool. In case of the brazing method, however, the abrasive 130 is attached to the shank 110 in a single layer, and thus, the release of abrasives through a long time service is inevitable although the abrasives are bonded to the shank and the boding material by a strong chemical bonding. Therefore, the service life thereof is disadvantageously shortened, as compared with the case of sintering method.

As an alternate method of forming a multi-layer fusion-bonded layer of abrasive, for example, a lower abrasive layer is formed according to the process of FIG. 6, which is repeated to thereby form an upper abrasive layer. In this case, during a second heat treatment for fusion bonding the upper abrasive layer, when the metal powder of a bonding material constituting the upper abrasive layer is melted, the metal bonding the abrasives and the shank in the lower abrasive layer is melted again. In this way, the metal powder in both the lower and upper abrasive layers is melted to thereby form a thick molten metal layer, which can easily flow under the gravity force. Therefore, the abrasives uniformly dispersed in the lower and upper abrasive layer are scattered in a random fashion and deviated with its thickness, so that the cutting or grinding ability may be deteriorated. In addition, the multiple abrasive layers, which are formed through a multi-layered melting by the repetition of process, cannot have a uniform mechanical property between layers and may causes a stratification when in use, thereby significantly deteriorating the cutting and grinding performance thereof.

DISCLOSURE OF INVENTION

Technical Problem

An object of the present invention is to provide a diamond tool and a method of manufacturing the same, in which multiple abrasive layers are formed on the shank so as to have a uniform distribution and thickness, thereby improving the performance and service life of the tool.

Another object of the present invention is to provide a diamond tool having a good performance and a method of manufacturing the same, in which multiple abrasive layers are provided to the diamond tools using a brazing and electroplating method, which have a good characteristic as compared with the sintering method, but have limitations in their use for a life-related reason, thereby simplifying significantly the manufacturing process and thus reducing the manufacturing cost therefor.

Technical Solution

According to an aspect of the present invention for achieving the above objects, there is provided a method of manufacturing a diamond tool having a shank and a plurality of abrasives attached thereto. The method of the invention comprises the steps of forming a plurality of concave portions in the surface of the shank, and bonding a plurality of abrasives to the inner space of the concave portion.

In the method of the invention, the step of bonding the plurality of abrasives may comprise a brazing method. For example, the boding step may comprise the steps of preparing a mixture of a bonding material of paste form and a plurality of abrasives; filling the mixture inside the concave portion; and heating the shank to thereby perform a fusion bonding. Alternatively, the bonding step may comprise the steps of filling a bonding material of paste form inside the concave portion; disposing a plurality of abrasives inside the concave portion so as to be dispersed in the bonding material; drying the bonding material; and heating the shank to thereby perform a fusion bonding. The step of bonding the plurality of abrasives may include an electroplating method. For example, the step of bonding the plurality of abrasives includes steps of: coating a non-conductive film on the surface of the shank except the concave portions; disposing a plurality of abrasives inside the concave portion; and electroplating the shank. In this case, a step of removing the non-conductive film may be included. The bonding step may further comprise the step of disposing the abrasive in such a way to be protruded onto the surface of the shank.

The manufacturing method of the invention may further comprise the step of bonding a plurality of abrasives on top of the abrasives and the bonding material and on the surface of the shank. In this case, the step of bonding a plurality of abrasives on top of the abrasives and the bonding material and on the surface of the shank may comprise the steps of coating a second bonding material of paste form on top of the abrasives and the bonding material and on the surface of the shank; dispersing a plurality of abrasives in the second bonding material, and drying the second bonding material; and heating the shank to thereby perform a fusion bonding. Alternatively, the step of bonding a plurality of abrasives on top of the abrasives and the bonding material and on the surface of the shank may comprise the steps of disposing a plurality of abrasives on top of the abrasives and the bonding material and on the surface of the shank; and electroplating the shank.

According to another aspect of the invention, there is provided a method of manufacturing a diamond tool having a shank and a plurality of abrasives attached thereto. The method of the invention comprises the steps of forming a plurality of concave portions in the surface of the shank; filling a bonding material of paste form and a plurality of abrasives inside the concave portion; coating a second bonding material of paste form on top of the filled bonding material and abrasives and on the surface of the shank; dispersing a plurality of abrasives in the second bonding material; drying the bonding materials; and heating the shank to thereby perform a fusion bonding. In this case, the method may further comprise a step of drying the bonding material inside the concave portion before the step of coating.

In the above method of the invention, the heating step may be carried out inside a batch type vacuum furnace, a reduction/inert gas atmosphere furnace, or a continuous gas atmosphere furnace using a conveyor.

According to a further aspect of the invention, there is provided a diamond tool having a shank and a plurality of abrasives attached thereto, in which a plurality of concave portions is formed in the surface of the shank and a plurality of abrasives is attached inside the concave portions.

In this case, the concave portion may include a dimple type concave portion or a groove type concave portion. The cross section of the concave portion may include, in perpendicular direction to the surface of the shank, a semi-circular shape, a semi-elliptic shape, a U-shape, a V-shape, or a wavy shape. In addition, a wall between the concave portions may have a rounded upper end edge. As an alternative, the concave portion may include a through-hole type concave portion. A groove may be formed in a main cutting face of the shank and a through-hole may be formed in a sub-cutting face of the shank.

Here, a ratio s/w of the spacing s to the width w of the concave portion is preferred to be in a range of 0.2 to 0.8. A ratio w/s of the width w of the concave portion to the maximum diameter a of the abrasive is preferred to be greater than 0.25. A ratio d/a of the depth d of the concave portion to the maximum diameter a of the abrasive is preferred to be greater than 0.25. In addition, a plurality of abrasives may be bonded to an upper portion of the concave portion, in which the abrasives and the bonding material is bonded, and the surface of the shank.

Furthermore, a projected height of the abrasives may be varied.

The aforementioned diamond tool may include a saw, a core drill, a cutter, a saw blade, a wire saw, a polishing cup, a profiler, an end mill, a straight wheel, an ID wheel, a rotary dresser, and an edge grinding wheel. The abrasive includes a synthetic and natural diamond, cubic boron nitride (cBN), silicone carbide, alumina, and a mixture of at least two thereof. The shank may be formed of stainless steel or carbon steel. In the shank, the abrasive-bonded portion may be thicker than the remaining portion thereof.

BEST MODE FOR CARRYING OUT THE INVENTION

Hereinafter, an embodiment of the present invention will be described in detail with reference to the accompanying drawings.

Figure 7:
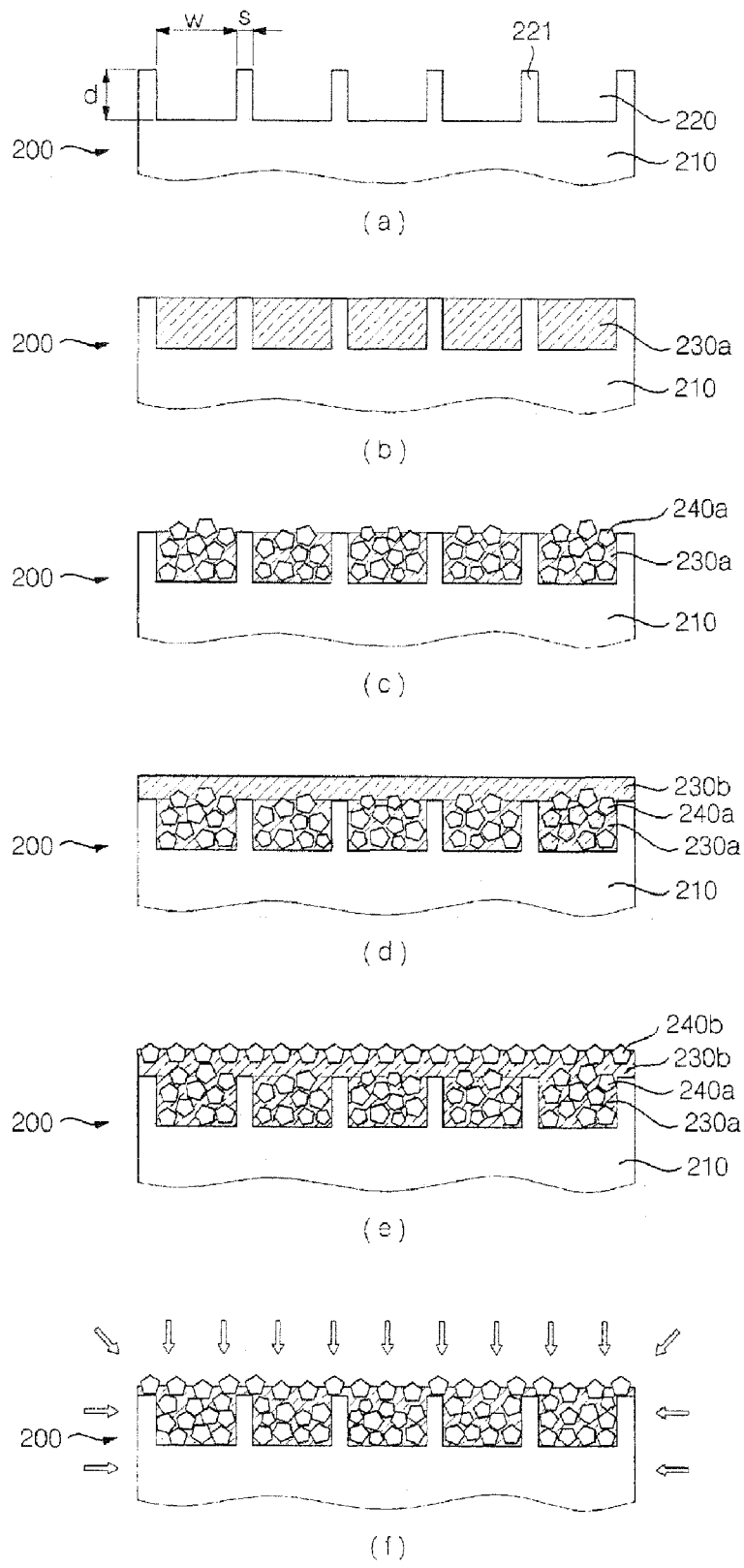
FIG. 7 illustrates a process for manufacturing a diamond tool having multiple abrasive layers using a brazing method according to the invention.

FIG. 7 illustrates a process for manufacturing a diamond tool having multiple abrasive layers using a brazing method according to the invention. As shown in FIG. 7 (a), first, a plurality of concave portion 220 is formed a shank. The depth d, the width w and the spacing s of the concave portion are determined based on the size of abrasives. That is, considering the maximum diameter a of the abrasive, the depth d and the width w of the concave portion 220 are predetermined, and these concave portions are formed so as to be spaced apart from one another with a certain desired spacing s provided between neighboring concave portions.

In FIG. 7 (a), the cross-section of the concave portion 220 is illustrated as a rectangular shape, but not limited thereto. Other shapes of the concave portion 220 will be hereinafter explained. In order to form a lower abrasive layer, as shown in FIG. 7 (b), a bonding material 230a of paste form containing a brazing metal powder and a binder is coated inside the concave portions 220 of the shank in FIG. 7 (a). Then, a plurality of abrasives 240a is filled in the bonding material 230a coated in the concave portion 220 and thereafter the bonding material 230a with the abrasives contained therein is primarily dried at a desired temperature (FIG. 7 (c)). The bonding paste 230a may be primarily dried before the abrasives 240a is dispersed in the coated paste. Next, in order to form an upper abrasive layer, a bonding paste 230b is coated on the top of the dried mixture of the bonding paste 230a and the abrasives 240a and on the surface of the shank 210 (i.e., the top surface of the wall 221) (FIG. 7 (d)). Then, a plurality of abrasives 240b is dispersed in the above-coated bonding paste 230b and the mixture of the bonding paste 230b and the abrasives 240b is secondarily dried at a desired temperature (FIG. 7 (e)). Upon completion of drying, the resultant product is heat-treated using a vacuum or reduction/inert gas atmosphere brazing furnace at a certain desired temperature, such that the brazing metal powder can be melted and adhered to the abrasives 240a and 240b and the shank 210, as shown in FIG. 7 (e). At this time, a vacuum furnace, which is mostly a batch type furnace, does not provide a good productivity. In case of the reduction/inert gas atmospheric furnace, a continuous process using a conveyor can be employed to thereby enhance the production efficiency significantly. On the other hand, as described above, the bonding paste 230a or 230b is first coated in the concave portions and then the abrasives 240a or 240b is dispersed in the coated bonding paste 230a or 230b. Alternatively, the bonding paste 230a and the abrasives 240a may be mixed first and the mixture may be coated in the concave portion 220. Similarly, the bonding paste 230b and the abrasive 240b may be mixed first to form a mixture, which may be then coated above the previous coated mixture and the top surface of the wall 221. In addition, the bonding materials 230a and 230b may be the same or different from each other. The upper abrasive layer is comprised of the bonding material 230b and the abrasive 240b, but the lower abrasive layer is comprised of the bonding material 230a, the abrasive 240a and the wall 221 (part of the shank) between the concave portions. The composition of the bonding paste 230a and the bonding paste 230b may be made to become different from each other, and also the metal powder contained in each bonding paste 230a, 230b may be made different. In this way, the lower abrasive layer, which is to be exposed after the upper abrasive layer is released or fallen apart, can have the same cutting or grinding characteristic as in the upper abrasive layer.

Here, the metal powders included in the bonding materials of the upper and lower abrasive layers are melted at the same time. However, since the metal powder of the bonding material 230a is filled in the concave portion 220, the melted metal powder is held in place, along with the abrasives 240a, due to the surface tension thereof, and thus cannot easily flow with the melted metal powder of the bonding material of the upper abrasive layer. Accordingly, the abrasives dispersed in the upper and lower abrasive layers are retained in their places without being scattered or disturbed, thereby enabling to avoid a deviation with the thickness thereof. Consequently, the abrasives 240a filled in the plural concave portions 220, which are formed in the surface of the shank 210, constitutes a lower abrasive layer, and the abrasives 240b disposed on the above abrasive 240a and the surface of the shank 210 constitutes an upper abrasive layer, i.e., plural abrasive layers are formed on the shank.

With the diamond tool having the above construction, when the upper abrasives 240b of the upper abrasive layer are fallen apart therefrom, the lower abrasive layer is subsequently exposed and the lower abrasives contained therein participates in the grinding and cutting work, thereby extending the service life of the tool. That is, although the lower abrasives 240a of the lower abrasive layer is retained inside the concave portion 220, the wall 221 between the concave portions 220 is easily abraded during a cutting or grinding process such that the abrasives 240a inside the concave portion 220 come to protrude above the surface of the tool and participate in the cutting or grinding work. Therefore, the width w, the depth d, and the spacing s of the concave portions 220 can be optimized such that the wall 221 can be appropriately abraded.

On the other hand, considering the abrasive size a, the minimum width and depth of the concave portion are preferred to be designed so as to be larger than the abrasive size so that part of the abrasives can be held, in its entirety, inside the concave portion. At this time, the spacing s between the neighboring concave portions is designed preferably such that the upper and lower abrasive layers can have a same abrasive concentration and thus exhibit a uniform and consistent cutting or grinding speed or performance.

Figure 8:
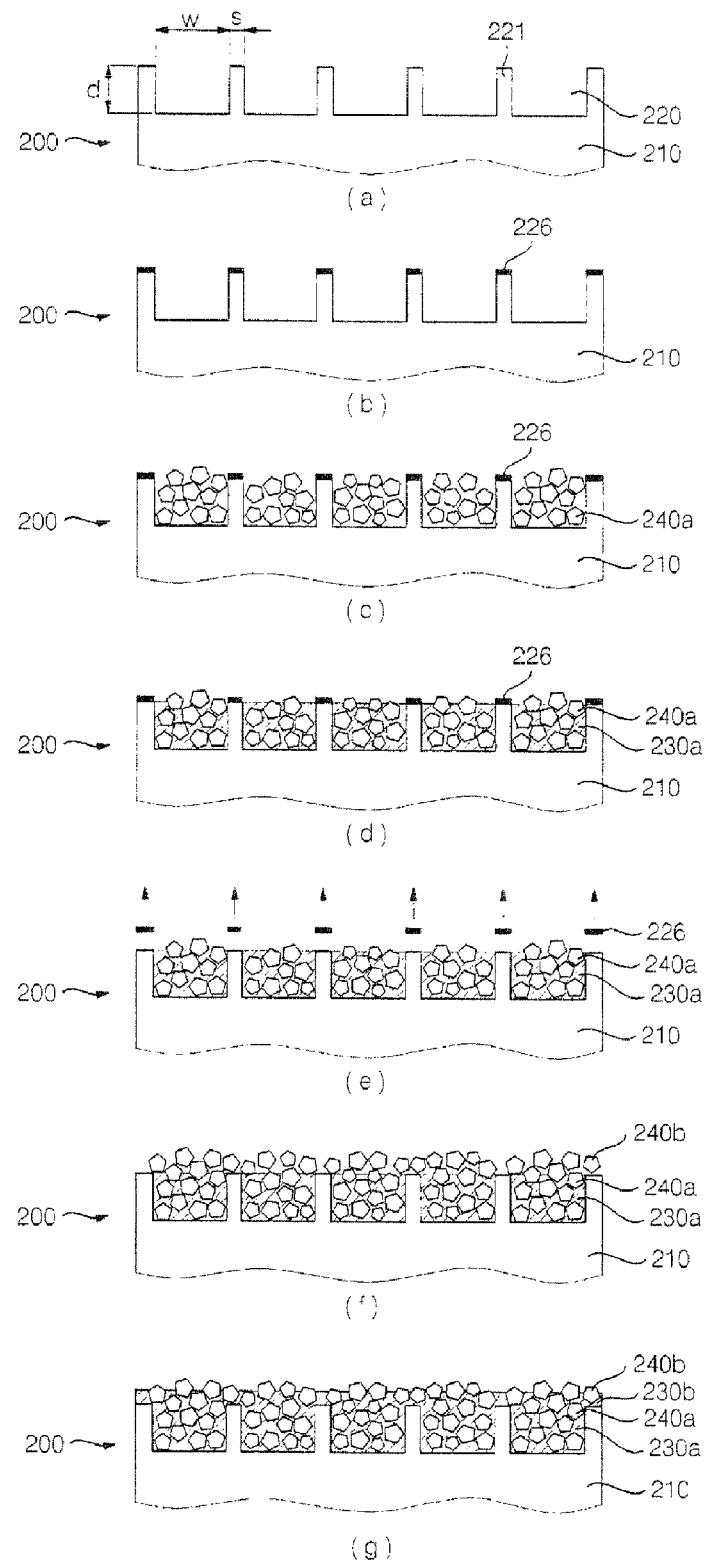
FIG. 8 illustrates a process for manufacturing a diamond tool having multiple abrasive layers using an electroplating method according to the invention.

The diamond tool of the invention can be manufactured through an electroplating method, instead of the above brazing method. FIG. 8 illustrates a process for manufacturing a diamond tool having multiple abrasive layers using an electroplating method according to the invention. Referring to FIG. 8, similar to the brazing method, first, a plurality of concave portions 220 is formed in a shank 210 (FIG. 8 (a)). As shown in FIG. 8 (b), the top surface of the wall 221 is coated with a non-conductive film 226 in order to prevent from being electroplated. Abrasives 240a are filled inside the concave portion 220 (FIG. 8 (c)) and then a wet electroplating process is performed in an electroplating bath. Thus, the electroplating is not processed on the non-conductive abrasives, but processed from the shank and gradually forms a bonding material 230a simultaneously while embedding the abrasives into the bonding material 230a being formed by the electroplating (FIG. 8 (d)). When the bonding material 230a is filled adequately inside the concave portion 220, the shank 210 is removed from the electroplating bath, thereby completing a primary electroplating to form a lower abrasive layer. Thereafter, the non-conductive film 226 coated on top of the wall 221 is removed (FIG. 8 (e)), and then abrasives 240b are uniformly disposed on the lower abrasive layer and on the top of the wall 221 (FIG. 8 (f)). In this case, the concave portion 220 and the wall 221 become conductive and thus a secondary electroplating can be performed thereon to thereby form an upper abrasive layer (FIG. 8 (g)). In this way, a diamond tool having two or more abrasive layers can be manufactured. In the brazing method, preferably a bonding paste is filled in the concave portion 220 first and then the abrasives are dispersed.

In contrast, in the electroplating method, the abrasives 240a are filled inside the concave portion 220 first and then a bonding material is electroplated inside the concave portion 220, and at the same time the abrasives are fixed into the bonding material.

On the other hand, the upper and lower abrasive layers may be formed through a combination of the brazing method and the electroplating method. That is, the upper and lower abrasive layers may be formed using either one of the brazing method and the electroplating method. Alternatively, the lower abrasive layer may be formed by the brazing method and the upper abrasive layer may be formed through the electroplating method, and vice versa. In a case where the lower and upper abrasive layers are formed respectively through a brazing method and an electroplating method, right after the step of FIG. 7 (c), the shank is to be heat-treated before performing the next steps for electroplating.

The diamond tool manufactured through the brazing and electroplating methods according to the invention can be modified in various ways. For example, in case of a brazing method, right after the step of FIG. 7 (c), the shank can be heat-treated to perform a fusion bonding, thereby providing a diamond tool to be used without an upper abrasive layer. Similarly, in case of an electroplating method, after finishing the step of FIG. 8 (d) or (e), the resultant product without an upper abrasive layer, in which the abrasive 240a and the bonding material 230a are provided in the concave portion 220, can be used as a diamond tool. In another modification, if the width w of and spacing s between the concave portions 220 are not changed and the depth d of the concave portion is made to be almost the same as the abrasive size a, two abrasive layers can be formed, thereby providing a same cutting and grinding characteristic to the upper and lower abrasive layers when in use. In addition, contrary to FIGS. 7 and 8, the size of the concave portion 220 can made to be smaller than that of abrasives such that the abrasive is partially inserted into the concave portion 220 and thus only the inserted portion of the abrasive is bonded to the shank through a brazing or an electroplating. In a case where an upper abrasive layer is formed on top of this lower abrasive layer, right after the abrasives of the upper layer is released therefrom, the abrasives of the lower layer can be exposed to thereby achieve a continuity of cutting or grinding work between the upper and lower abrasive layers.

As described above, in order for the abrasives to be continually exposed, the ratio d/a of the depth of concave portion to the abrasive size is to be at least ¼, and also the ratio w/a of the width of concave portion to the abrasive size is preferred to be at least ¼. In addition, in order to obtain uniform cutting and grinding characteristics, the ratio s/w of the spacing to the width of the concave portion is preferred to be within a range of 0.2 to 0.8.

Figure 9:
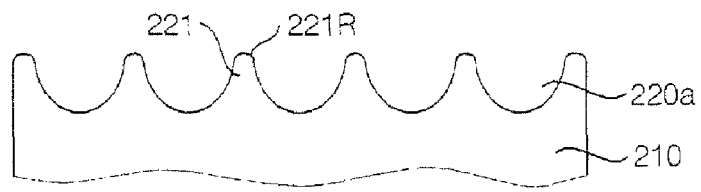
FIGS. 9 and 10 are sectional views showing alternative patterns of a concave portion formed in the surface of a shank.
Figure 10:

In FIGS. 7 and 8, the shape of the concave portion 220 is illustrated to have a rectangular cross-section, but not limited thereto. As illustrated in FIGS. 9 and 10, the concave portion may have a semi-elliptic cross section 220a or a V-shaped cross section 220b. Besides, the concave portion may have a semi-circular cross-section, a U-shaped cross-section, a wavy cross-section, or the like. On the other hand, in FIGS. 7 and 8, the upper end portion of the wall 221 is illustrated to have a right angle edge, but it may be formed so as to have a round shape 221R, thereby facilitating the fluidity of paste and improving the adhesiveness of abrasives near the edge. This round shape 221R can be applied to the rectangular cross-section shown in FIGS. 7 and 8.

In the above, the present invention has been described, referring to the cross-section of the concave portion 220.

Figure 11:
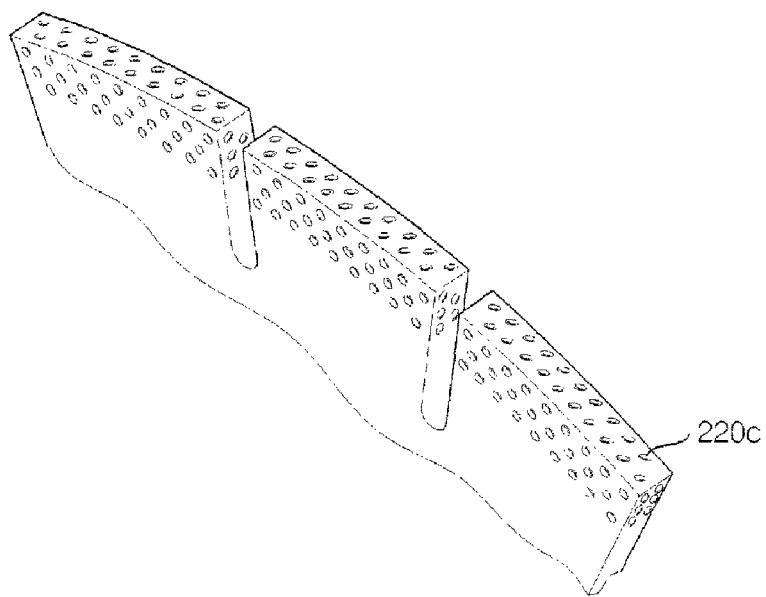
FIGS. 11 to 13 are perspective, front and sectional views showing examples of a concave portion formed in the surface of a shank, respectively.
Figure 12:
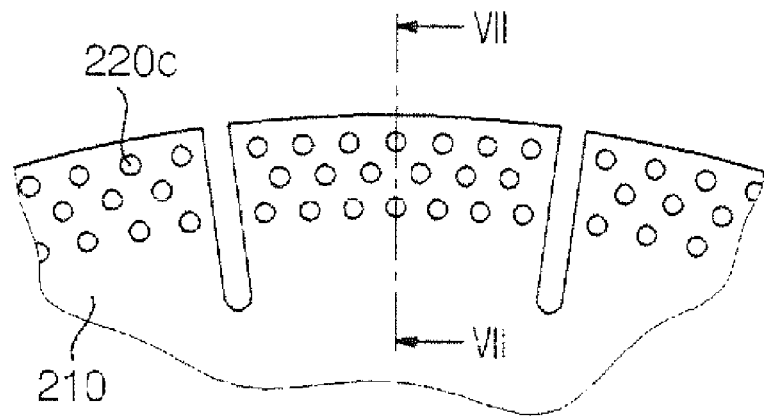
Figure 13:
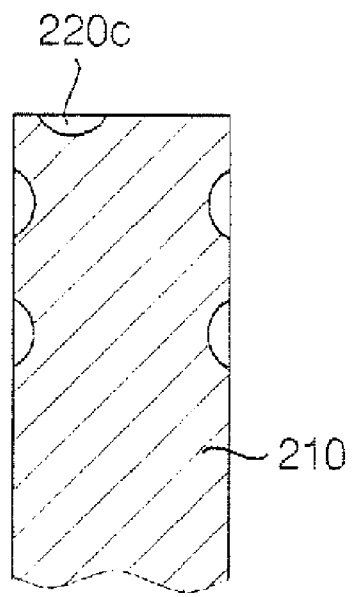
Figure 14:
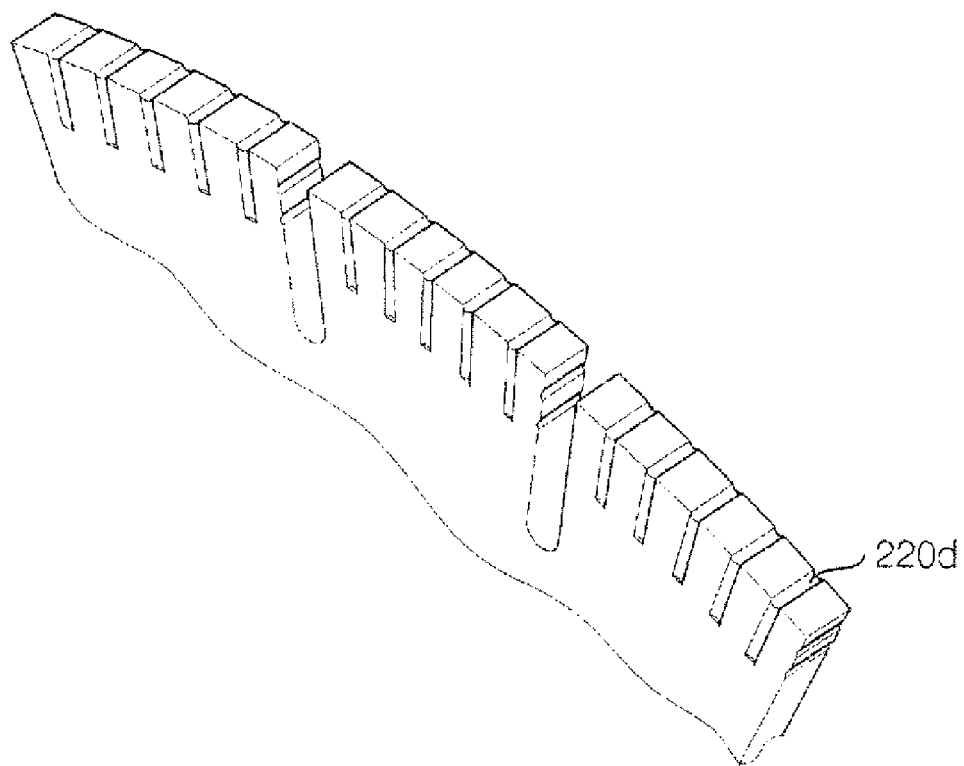
FIGS. 14 to 16 are perspective, front and sectional views showing another example of a concave portion formed in the surface of a shank, respectively.
Figure 15:
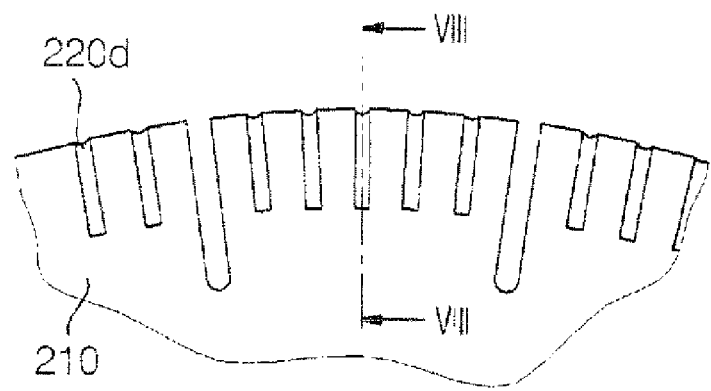
Figure 16:
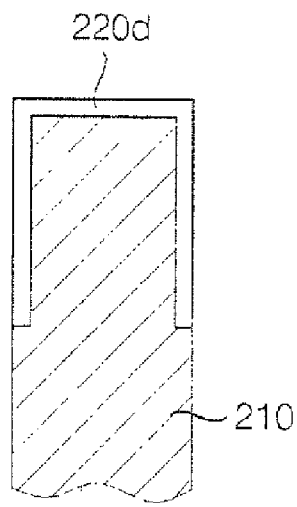
Figure 17:
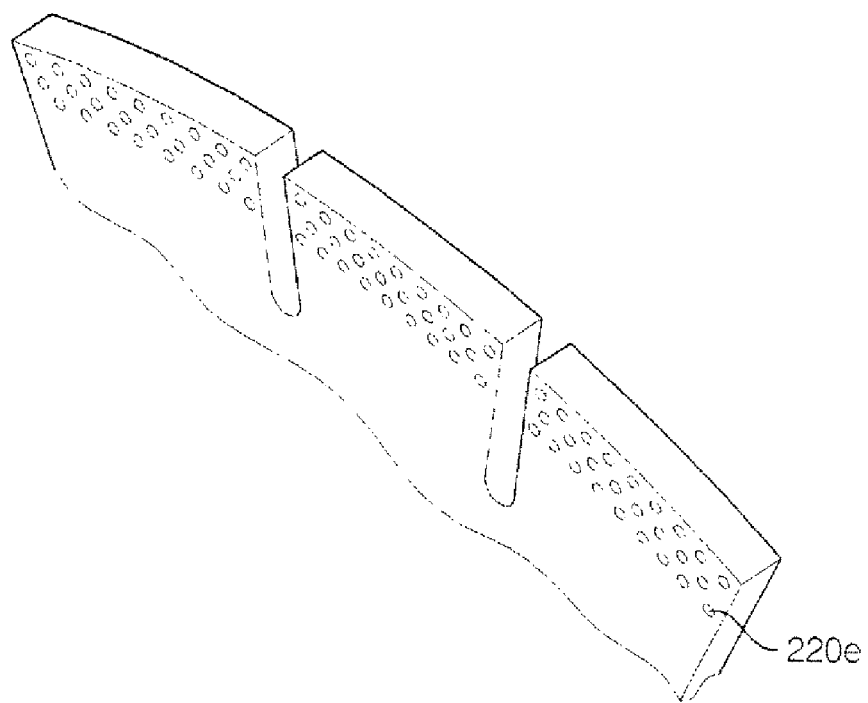
FIGS. 17 to 19 are perspective, front and sectional views showing a further example of a concave portion formed in the surface of a shank, respectively.
Figure 18:
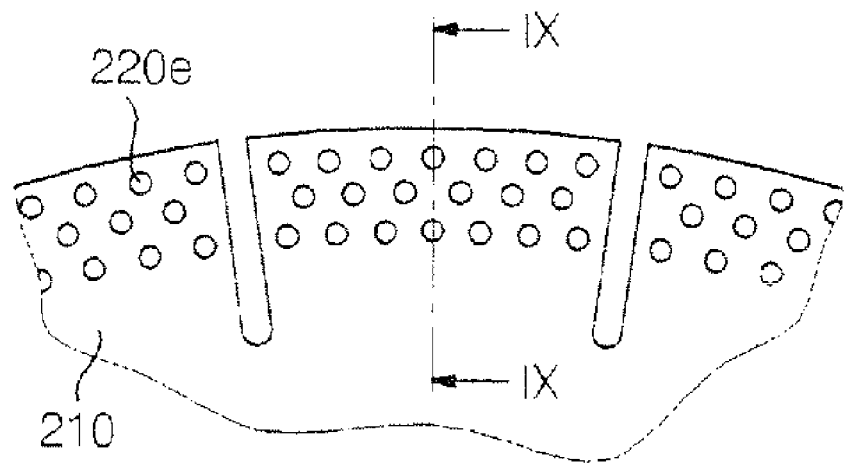
Figure 19:
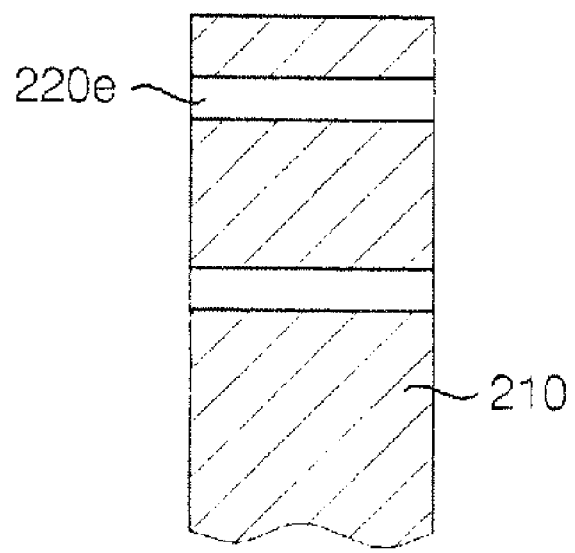

Hereafter, the configuration of the whole concave portions formed in the shank will be explained. In the description, the term "concave portion" includes all the shapes, which are sunken under the surface of the shank. For example, the shape of the concave portion includes a dimple type such as a semi-sphere, a semi-ellipsoid, an inverse cone, a rectangular pole, a cylinder or the like. In addition, it may includes an elongated groove type having a cross-section such as a semi-circle, a semi-oval, a U-shape, a V-shape, or a rectangular shape, and furthermore a through-hole type passing through the opposing sides of a shank and having various shape of cross-sections. Also, this concave portion includes a space between projected portions, which may be formed on the surface of the shank through a coating process, an electro-plating process, a bonding process or the like. FIGS. 11, 14 and 17 are perspective views showing the shank tip of a saw blade, where in the surface of the shank is formed respectively a dimple type concave portion 220c, an elongated groove type concave portion 220d, and a through-hole type concave portion 220e. FIGS. 12, 15 and 18 are front views of the saw blades shown in FIGS. 11, 14 and 17, respectively. FIGS. 13, 16 and 19 are sectional views taken along the line VII-VII, VIII-VIII, and IX-IX in FIGS. 12, 15 and 18, respectively. In addition, the shank of the saw blade is illustrated so as to have the same thickness as that of the abrasive tip (cutting tip). In a common tool having a shank and a sintered tip bonded to the shank through a welding or the like, shown in the figures, however, the abrasive tip is made to have a thickness around 10~45% thicker than that of the shank such that an appropriate clearance can be provided to both sides of the shank, thereby preventing impact and degradation of cutting ability, due to contact and friction with a workpiece. Commonly, in case of a diamond tool of small size, if the abrasive layer is formed in a uniform thickness shank by a brazing or electro-plating so as to have a thickness 10~45% thicker than the remaining portion of the shank, the shank does not need to be provided with a clearance beforehand. In case of a thick shank, however, it is preferable that the abrasive layer section in the shank is made to have a thicker thickness beforehand. In the figures, the shank is illustrated to have a uniform thickness, for the purpose of convenient explanation of the invention.

On the other hand, in FIGS. 11 to 19, the dimensions of the concave portions 220c to 220e are exaggerated, relative to the tip size of the saw blade, for the purpose of clear illustration of the shape thereof. The number of the concave portions is illustrated more or less than the actual number thereof. The shape, the size and the number of concave portions are to be designed appropriately, depending on the strength and ductility of a workpiece, etc.

Figure 1:
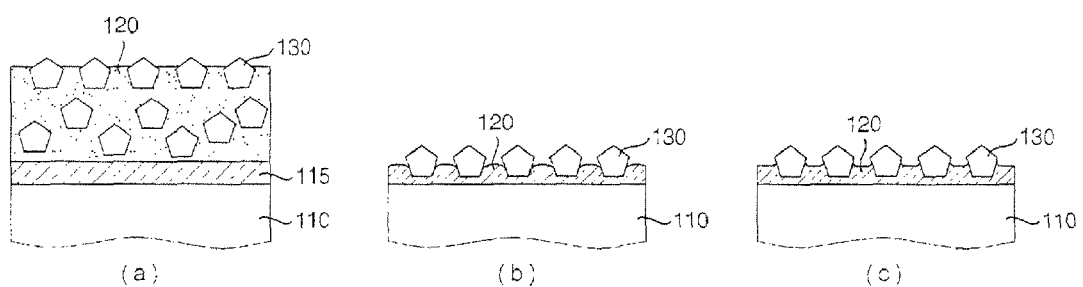
FIG. 1 is a sectional view of abrasives bonded to a shank by a bonding material respectively through a sintering method (FIG. 1 (a)), an electroplating method (FIG. 1 (b)) and a brazing method (FIG. 1 (c)).
Figure 2:
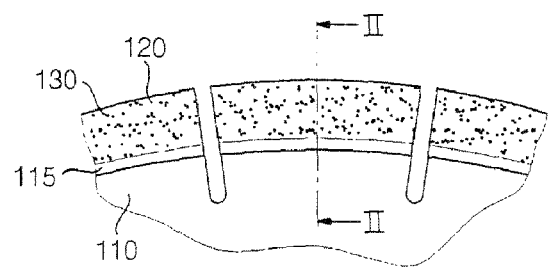
FIG. 2 is a front view of a saw blade where abrasives are bonded to a shank through a sintering method.
Figure 3:
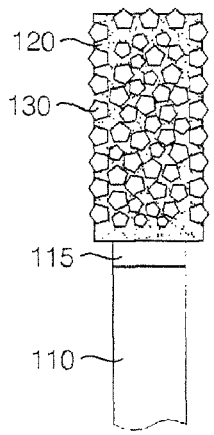
FIG. 3 is a sectional view taken along the line II-II in FIG. 2.
Figure 4:
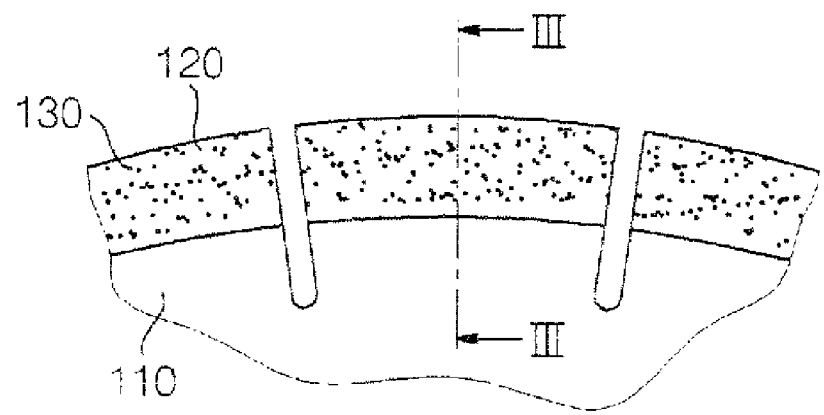
FIG. 4 is a front view of a saw blade where abrasives are bonded to a shank through a brazing method or an electroplating method.
Figure 5:
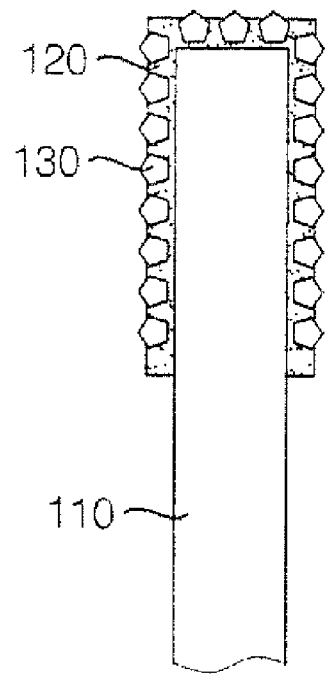
FIG. 5 is a sectional view taken along the line III-III in FIG. 4.
Figure 6:
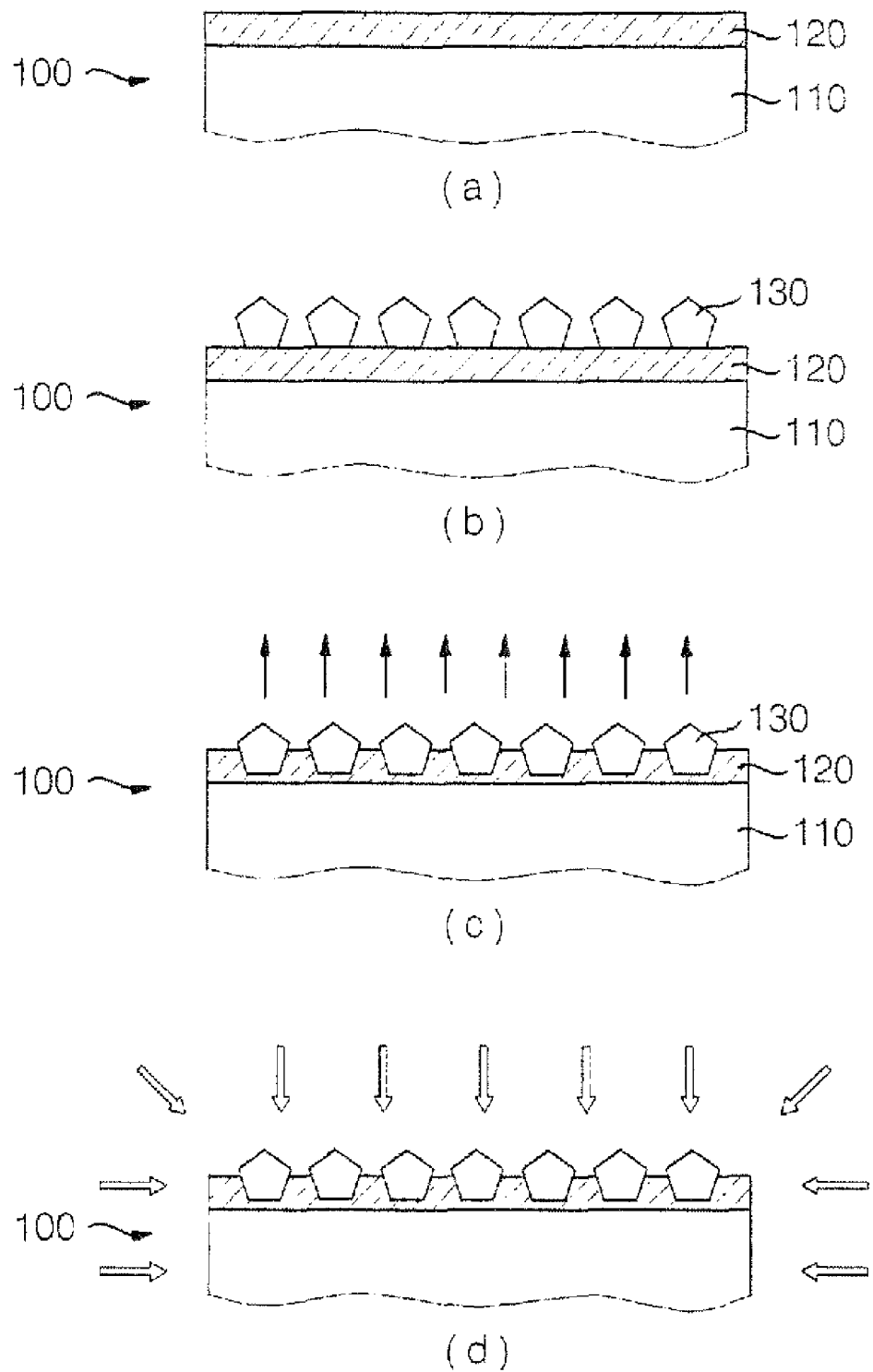
FIG. 6 illustrates a process of bonding abrasives to a shank according to a brazing method.
Figure 20:
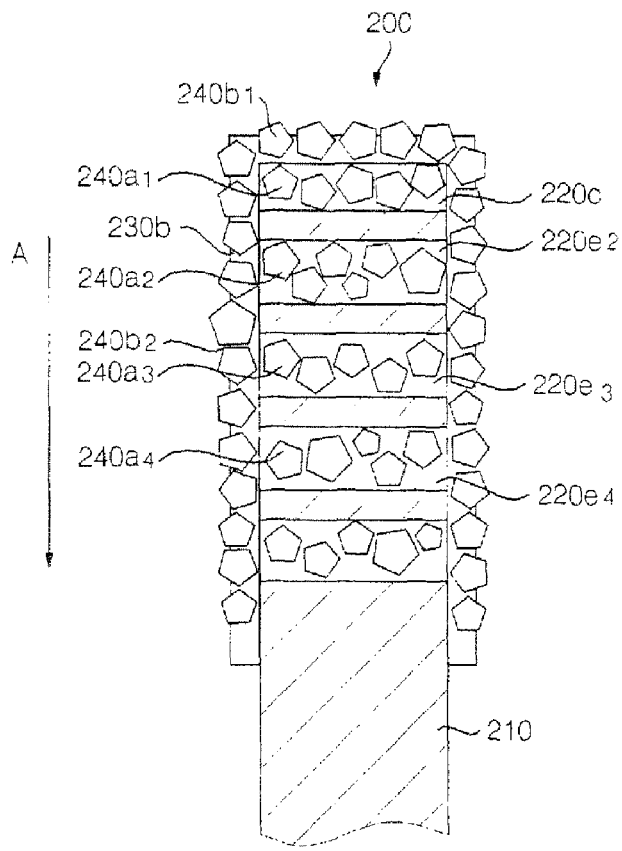
FIG. 20 is a sectional view illustrating a diamond tool having multiple abrasive layers according to the invention.

The concave portions having various shapes may be, needless to say, combined with each other in various ways. For example, in case of a diamond tool mainly used for a grinding or cutting work (e.g., a saw blade), preferably, the top surface of the tip (the outer circumferential face thereof), i.e., a main cutting face is provided with a concave portion 220d of a groove type formed along the thickness direction, and the side surface of the tip, i.e., a sub-cutting face, is provided with a concave portion 220e of a through-hole type formed in such a way to pass through in the thickness direction. FIG. 20 is a sectional view of a diamond tool according to the invention, where abrasives are bonded to a shank 210 having a concave portion 220d of a groove type and a concave portion 220e of a through-hole, type using the methods illustrated in FIGS. 7 and 8. In case of a saw blade, the front view thereof is identical to FIG. 4, and thus FIG. 20 can be regarded as a sectional view taken along the line III-III in FIG. 4.

In the concave portion 220d of a groove type formed in the top surface of the tool tip, abrasives 240a1 are bonded through a bonding material 230a. In the concave portion 220e2, 220e3, and 220e4 of a through-hole type, abrasives 240a2, 240a3, 240a4 are bonded through a bonding material 230a. In the surface of the shank, abrasives 240b1, 240b2 are bonded through a bonding material 230b.

When a common diamond tool is used for cutting or grinding, its main cutting face, i.e., the top surface of the tool tip is involved mostly in the cutting or grinding process, and thus the abrasives 240b1 bonded to the top surface of the tool tip are first released or fallen apart. As the cutting or grinding proceeds, along with continuous release of the abrasives 120b2 in the sub-cutting face, release of the abrasives 240a2, wear of the shank between the abrasives 240a2 and 240a3, release of the abrasives 240a3, wear of the shank between the abrasives 240a3 and 240a4, and release of the abrasives 240a4 are occurred in sequence along the arrow A, thereby extending significantly the service life of the tool.

Figure 21:
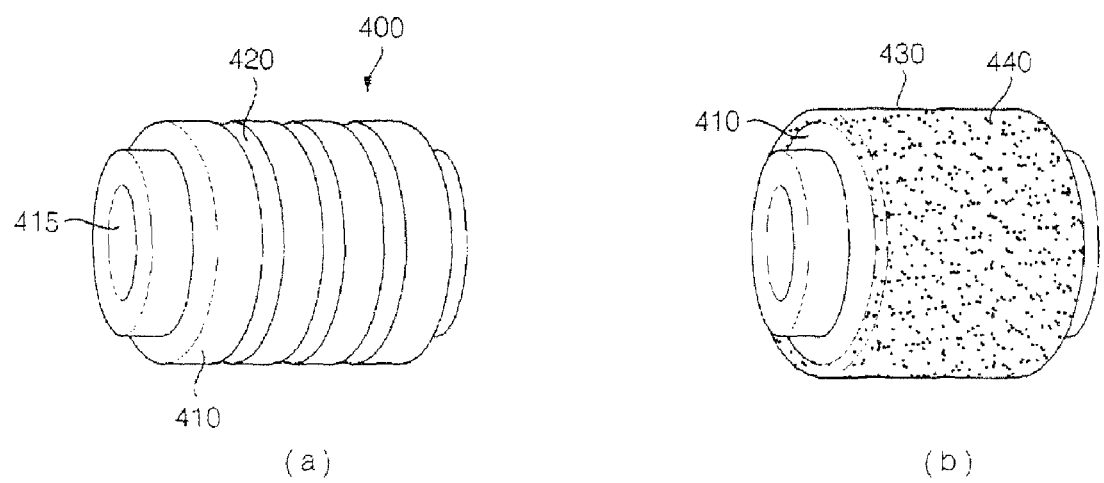
FIG. 21 is a perspective view illustrating a shank (a) and an abrasive layer (b) formed thereon of a wire saw bead according to the invention.

Although the present invention has been explained, illustrating a saw blade, it can be applied to a saw, a core drill, a cutter, a wire saw, a polishing cup, a profiler, an end mill, a straight wheel, an ID wheel, a rotary dresser, and an edge grinding wheel. For example, FIG. 21 shows a bead 400 of a wire saw according to the invention. In a wire saw, a plurality of beads 400 is inserted into a wire (not shown) through a through-hole 415 and a workpiece is cut by means of a linear motion of the wire. In order to apply the invention to the bead of a wire saw, as shown in FIG. 21 (a), a concave portion 420 of a groove type is formed in the outer surface of a shank 410 in a circumferential direction or an inclined direction like a screw pitch. Then, an abrasive 440 is bonded through a bonding material 430 using the methods illustrated in FIGS. 7 and 8, to thereby form multiple abrasive layers. FIG. 21 (b) is a perspective view of the bead of a wire saw finished according to the invention, but which cannot be distinguished, in appearance, from conventional ones.

Figure 22:
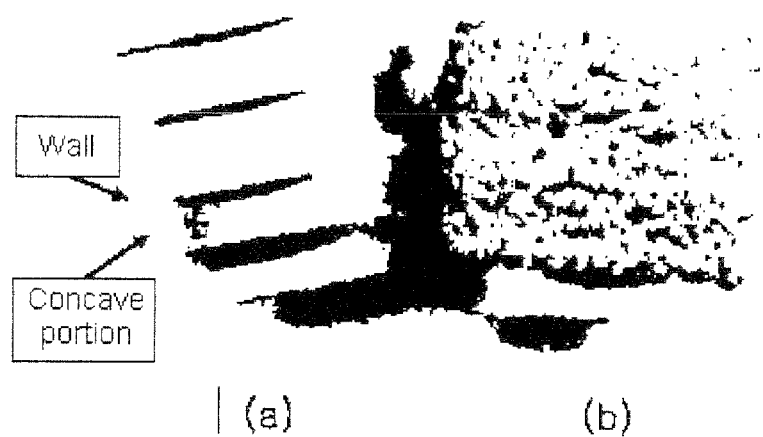
FIG. 22 is a photograph showing a shank (a) and an abrasive layer (b) formed thereon of a wire saw bead according to the invention.

FIGS. 22 (a) and (b) are photographs showing respectively a shank of a wire saw bead of the invention where a concave portion of a groove type is formed along the outer circumference thereof, and the surface of a final product after the fusion bonding process. It can be seen from FIG. 22 that, in the upper abrasive layer, the abrasive layer corresponding to the concave portion is slightly sunken lower than that funned on the top surface of the wall. That is, the upper abrasive layer is formed so as to have a slightly curved surface, due to the bonding paste flow and the gravity force during the fusion bonding process. In this way, the curved surface formed in the upper abrasive layer functions to reduce the initial cutting load when in use, thereby enabling to promote the cutting speed thereof. In FIG. 7 (f), similarly, the abrasive layer formed on the top surface of the wall is slightly protruded above the abrasive layer formed on the concave portion. However, the abrasive layer on the top surface of the wall may be formed to be slightly lower than the remaining portion, for example, by filling more abrasives into the concave portion to thereby form the lower abrasive layer so as to be protruded higher than the surface of the wall. Consequently, if the upper abrasive layer is formed to have a curved face, i.e., the projected height of abrasives in a diamond-impregnated section is varied, the initial cutting load when in use can be reduced to thereby make a contribution to enhancement in the cutting speed thereof.

Figure 23:
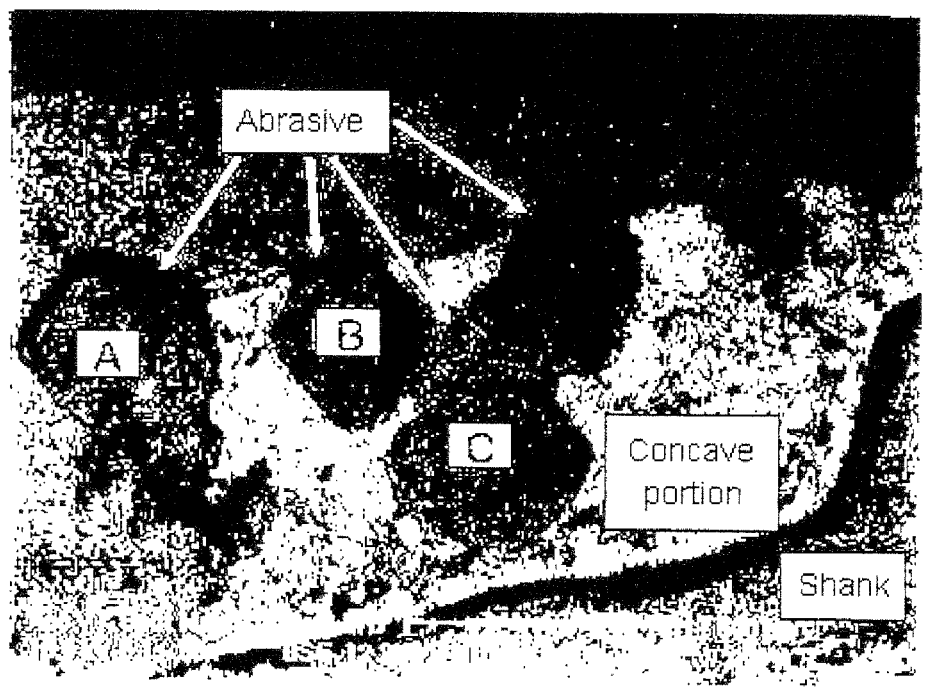
FIG. 23 is a photograph showing a sectional view of a wire saw bead according to the invention.

FIG. 23 is a SEM photograph showing a sectional view of a wire saw bead manufactured according to the invention. In FIG. 23, the lower curvature indicates a concave portion 420 and a wall of the shank. The relatively bright portion is a fusion-bonded nickel, and the abrasives are fusion-bonded so as to be continually exposed from the bottom of the concave portion up to the upper abrasive layer. That is, the abrasive A placed on top of the wall is exposed most, next the abrasive B in the upper portion of the concave portion will be exposed, and then the abrasive C will be exposed, continually in sequence. Therefore, the cutting characteristics are not significantly changed from the upper abrasive layer to the lower abrasive layer. Also, it has been found that a slight curvature is formed in the surface of the upper abrasive layer. This is because the abrasive layer in the top surface of the wall is formed to become higher than that in the upper portion of the concave portion.

INDUSTRIAL APPLICABILITY

In the diamond manufacturing method of the present invention, a concave portion is formed in a shank, abrasives are filled in the concave portion along with a bonding material to thereby form a lower abrasive layer, and again an upper abrasive layer is formed on top of the lower abrasive layer. Therefore, when the metal powder contained in the bonding material is melted to bond the shank and the abrasives, the abrasives and the melted powder in the lower layer is retained in the concave portion and thus cannot flow easily. Accordingly, the lower and upper abrasive layers have a uniform thickness and the abrasives uniformly dispersed with a desired spacing are fusion-bonded in their right places, thereby improve the performance and service life of the tool. Furthermore, if the shank is formed with a through-hole, in which abrasives are filled, two or more abrasive layers can be formed. Accordingly, during the fusion bonding, the abrasive and the bonding material is bonded with each other through a strong chemical bonding. In addition, multiple abrasive layers are formed, thereby extending the service life of the tool, as compared with one manufactured by a sintering method. On the other hand, an electroplating method is used for forming a lower and upper abrasive layer on the shank. In this case, similarly, the service life thereof can be extended, as compared with a common diamond tool having a single abrasive layer.

In both the brazing method and the electroplating method, the width, the depth, and the spacing of the concave portion can be optimally designed so as to expose the lower abrasive layer right after the upper abrasive layer is worn out, thereby providing a tool capable of cutting and grinding a workpiece with a uniform and consistent speed.

In particular, a batch type vacuum furnace and a reduction or inert gas atmosphere furnace used in the brazing method embraces a limitation in enhancing the productivity. If a reduction or inert gas atmosphere furnace using a conveyor is employed, the production efficiency can be significantly improved, thereby reducing the manufacturing cost of the tool.

From the foregoing, it will be understood by those skilled in the art that various changes and modifications can be made within the technical spirit and scope of the present invention. Therefore, the spirit and scope of the present invention is not limited to the contents described in the preferred embodiment but to the appended claims.

The invention claimed is:

1. A diamond tool having a shank and a plurality of abrasives attached thereto,
   wherein a plurality of concave portions are formed in a surface of the shank and a first portion of the plurality of abrasives are bonded into the concave portions to form a first abrasive layer,
   wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers,
   wherein a cross-section of the concave portion taken along a direction perpendicular to the surface of the shank includes a semicircular shape, a semi-elliptic shape, a U-shape, a V-shape, or a wave shape.

2. The diamond tool as claimed in claim 1, wherein a ratio (s/w) of the spacing (s) between the concave portions to the width (w) of the concave portion is within a range of 0.2 to 0.8.

3. The diamond tool as claimed in claim 1, wherein a ratio (w/a) of the width (w) of the concave portion to the maximum diameter (a) of the abrasive is greater than 0.25.

4. The diamond tool as claimed in claim 1, wherein the concave portion includes a through-hole concave portion.

5. The diamond tool as claimed in claim 1, wherein the plurality of concave portions comprise a groove concave portion formed in a main cutting face of the shank, and a through-hole concave portion formed in a sub-cutting face of the shank.

6. The diamond tool as claimed in claim 1, wherein the diamond tool includes a saw, a core drill, a cutter, a saw blade, a wire saw, a polishing cup, a profiler, an end mill, a straight wheel, an ID wheel, a rotary dresser, and an edge grinding wheel.

7. The diamond tool as claimed in claim 1, wherein the abrasive includes synthetic and natural diamond, cubic boron nitride(cBN), silicon carbide, alumina, and a mixture of at least two thereof.

8. A diamond tool having a shank and a plurality of abrasives attached thereto,
   wherein a plurality of concave portions are formed in a surface of the shank and a first portion of the plurality of abrasives are bonded into the concave portions to form a first abrasive layer,
   wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers, and
   wherein a wall between the concave portions has a rounded upper end edge.

9. A diamond tool having a shank and a plurality of abrasives attached thereto,
   wherein a plurality of concave portions are formed in a surface of the shank and a first portion of the plurality of abrasives are bonded into the concave portions to form a first abrasive layer,
   wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers, and
   wherein a ratio (s/w) of the spacing (s) between the concave portions to the width (w) of the concave portion is within a range of 0.2 to 0.8.

10. The diamond tool as claimed in claim 9, wherein the concave portion includes a dimple or a groove.

11. The diamond tool as claimed in claim 9, wherein the concave portion includes a through-hole concave portion.

12. The diamond tool as claimed in claim 9, wherein the plurality of concave portions comprise a groove concave portion formed in a main cutting face of the shank, and a through-hole concave portion formed in a sub-cutting face of the shank.

13. A diamond tool having a shank and a plurality of abrasives attached thereto,
- wherein a plurality of concave portions are formed in a surface of the shank and a first portion of the plurality of abrasives are bonded into the concave portions to form a first abrasive layer,
- wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers, and
- wherein a ratio (w/a) of the width (w) of the concave portion to the maximum diameter (a) of the abrasive is greater than 0.25.

14. The diamond tool as claimed in claim 13, wherein the concave portion includes a dimple or a groove.

15. The diamond tool as claimed in claim 13, wherein the concave portion includes a through-hole concave portion.

16. A diamond tool having a shank and a plurality of abrasives attached thereto,
- wherein a plurality of concave portions are formed in a surface of the shank and a first portion of the plurality of abrasives are bonded into the concave portions to form a first abrasive layer,
- wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers, and
- wherein a ratio (d/a) of the depth (d) of the concave portion to the maximum diameter (a) of the abrasive is greater than 0.25.

17. The diamond tool as claimed in claim 16, wherein the concave portion includes a dimple or a groove.

18. The diamond tool as claimed in claim 16, wherein the concave portion includes a through-hole concave portion.

19. A diamond tool having a shank and a plurality of abrasives attached thereto,
- wherein a plurality of concave portions are formed in a surface of the shank and a first portion of the plurality of abrasives are bonded into the concave portions to form a first abrasive layer,
- wherein a second portion of the plurality of abrasives are formed over the first portion of the plurality of abrasives bonded into the concave portions and onto a top surface of the shank to form a second abrasive layer overlying the first abrasive layer, thereby forming multiple abrasive layers, and
- wherein a height of the second portion of the plurality of abrasives is varied.

* * * * *